United States Patent
Schneider et al.

(10) Patent No.: US 9,057,033 B2
(45) Date of Patent: Jun. 16, 2015

(54) METHOD AND DEVICE FOR PRODUCING SYNTHESIS GAS AND FOR OPERATING AN INTERNAL COMBUSTION ENGINE THEREWITH

(76) Inventors: Arno Schneider, Wachtberg (DE); Ergun Cehreli, Cologne (DE)

( * ) Notice: Subject to any disclaimer, the term of this patent is extended or adjusted under 35 U.S.C. 154(b) by 351 days.

(21) Appl. No.: 13/583,689

(22) PCT Filed: Mar. 11, 2010

(86) PCT No.: PCT/DE2010/000259
§ 371 (c)(1),
(2), (4) Date: Sep. 10, 2012

(87) PCT Pub. No.: WO2011/110138
PCT Pub. Date: Sep. 15, 2011

(65) Prior Publication Data
US 2013/0000569 A1    Jan. 3, 2013

(51) Int. Cl.
*F02B 43/08* (2006.01)
*C10K 1/14* (2006.01)
(Continued)

(52) U.S. Cl.
CPC . *C10K 1/14* (2013.01); *F02B 43/08* (2013.01); *Y02T 10/32* (2013.01); *C10J 3/482* (2013.01); *C10J 3/503* (2013.01); *C10J 3/62* (2013.01); *C10K 1/026* (2013.01); *C10K 1/028* (2013.01); *C10B 47/30* (2013.01); *C10J 2300/0906* (2013.01); *C10J 2300/0916* (2013.01); *C10J 2300/0956* (2013.01); *C10J 2300/1621* (2013.01); *C10J 2300/165* (2013.01); *C10J 2300/1675* (2013.01);
(Continued)

(58) Field of Classification Search
USPC ............................................................ 123/3
See application file for complete search history.

(56) References Cited

U.S. PATENT DOCUMENTS

| 2,743,217 A | 4/1956 | Silsby |
| 4,385,905 A | 5/1983 | Tucker |
| 4,678,860 A * | 7/1987 | Kuester ............................ 585/14 |
| 5,707,582 A | 1/1998 | Wischemann |

(Continued)

FOREIGN PATENT DOCUMENTS

| DE | 4238943 A1 | 1/1994 |
| DE | 19824747 A1 | 12/1999 |
| DE | 10258485 A1 | 7/2004 |
| DE | 102004055407 A1 | 5/2006 |
| DE | 102006017353 A1 | 10/2007 |
| DE | 102007004294 A1 | 7/2008 |
| EP | 1312662 A2 * | 5/2003 ................. C10J 3/66 |

(Continued)

OTHER PUBLICATIONS

Gesetz für den Vorrang Erneuerbarer Energien (Erneuerbare-Energien-Gesetz—EEG) dated Jul. 21, 2004, pp. 1-18.

*Primary Examiner* — Hung Q Nguyen
(74) *Attorney, Agent, or Firm* — Novak Druce Connolly Bove + Quigg LLP

(57) ABSTRACT

Provided are a method and a device for producing synthesis gas and for operating an internal combustion engine therewith. The engine fuel gases can be produced from changing heterogeneous organic fuels, wherein highly tar-laden product gas and pyrolysis gas are formed. The gas mixtures or the syntheses gas formed and by special operation of the gas engine are usable as an addition to the ignition oil. The synthesis gas is generated from the pyrolysis gas that is generated in a pyrolysis reactor and from the product gas that results from autothermal gasification of the pyrolysis coke formed and/or of the pyrolysis oil in an atmospheric steady-state fluidized bed gasifier. Then purifying the synthesis gas in a gas scrubber and in an tar electrostatic filter, passing the synthesis gas via a compressor into a separate injector of a two-stroke dual-fuel engine, bypassing turbocharger and intercooler.

20 Claims, 3 Drawing Sheets

(51) Int. Cl.
*C10J 3/62* (2006.01)
*C10J 3/48* (2006.01)
*C10J 3/50* (2006.01)
*C10K 1/02* (2006.01)
*C10B 47/30* (2006.01)

(52) U.S. Cl.
CPC . *C10J 2300/1693* (2013.01); *C10J 2300/1823* (2013.01); *C10J 2300/1838* (2013.01); *C10J 2300/1869* (2013.01); *C10J 2300/1884* (2013.01); *C10J 2300/1892* (2013.01); *C10J 2200/158* (2013.01)

(56) References Cited

U.S. PATENT DOCUMENTS

2004/0182000 A1* 9/2004 Mansour et al. ......... 48/197 FM
2009/0056537 A1 3/2009 Neumann
2010/0031560 A1* 2/2010 Calabrese et al. .............. 44/550

FOREIGN PATENT DOCUMENTS

WO WO-02/04574 A1 1/2002
WO WO-2009/020442 A1 2/2009
WO WO-2010/015593 A2 2/2010

* cited by examiner

Schnitt A-B

METHOD AND DEVICE FOR PRODUCING SYNTHESIS GAS AND FOR OPERATING AN INTERNAL COMBUSTION ENGINE THEREWITH

CROSS REFERENCE TO RELATED APPLICATIONS

This application is a National Phase filing under 35 U.S.C. §371 of PCT/DE2010/000259 filed on Mar. 11, 2010, the entire contents of which is hereby incorporated by reference.

The invention concerns a method for producing synthesis gas as well as additional fuels made of organic raw and waste materials of an internal combustion engine for operating the same, in particular used for decentralized generation of current and heat. Moreover, a device for implementing said method includes the internal combustion engine to be used.

According to document DE 42 38 934 C2, a method for gasifying such raw and waste materials, in which the unsorted substances are gasified by a combination of thermal pre-treatment, shredding and entrained-flow gasification, to generate a gas rich in CO and $H_2$. The result is a brittle, ground intermediate product, which is subjected to entrained-flow gasification as a fine product. Said gas is used for operating gas engines and gas turbines or as a synthesis gas.

According to document DE 10 2004 055-407 A1, a method for operating a gas engine with a synthesis gas made of an organic fuel, in particular a biomass, is also known, whereas said engine serves for decentralised energy supply (block heat and power plants). To do so, an autothermal gasification is conducted by means of a fixed bed gasifying device. The synthesis gas generated is fed into the engine combustion chamber together with the sucked-in combustion air once the same has been mixed thoroughly.

With said gasification plants, a defined, unchanging fuel is required for technically immaculate operation. They cannot, to a certain extent, be operated directly variably with alternating, heterogeneous organic fuels. Furthermore, special measures should be taken to prevent tar deposits from building up in the combustion chamber of the gas engine.

To remedy these shortcomings, the present invention intends to provide a method for recycling any thinkable biomass or processed organic waste as material for producing a combustion gas for operating gas engines, whereas such materials so far were not suitable for gasification in mere gasification plants. According to a further object, the gas engines should be operable in efficient, decentralised energy generation plants as of a power of 500 kWel, as well with simultaneous heat off-take.

It should be possible, in the context of these objects, also with special gas engines to operate them as well with the combustion gas obtained by gasification as with the oils, condensates and tars generated during their production. The aim is here in particular to realise a method of decentralised energy production with which the internal combustion engine can be operated with pyrolysis gas, pyrolysis oil, tar, product gas, synthesis gas or a mixture of these components.

The essential idea behind the invention is hence that contrary to the current practices of the trade, in which gasification processes are generally carried out in such a way that clean, i.e. tar-free combustion gas appear, when contemplating a motoring use, henceforth according to the invention in addition to a generated "high-quality synthesis gas", which is tar-free, additional pyrolysis condensates having a high proportion of tar can be burned as an ignition oil in a special gas engine provided to that effect, i.e. a gas-diesel engine. An internal combustion engine is used to that end, which is operated as a two-stroke dual-fuel engine with diesel injection and with an additional gas control loop.

The aim is to realise a method of decentralised energy production, with which the internal combustion engine can be operated with generated pyrolysis gas, pyrolysis oil, tar, product gas, synthesis gas or a mixture of these components. To do so, a technique is used for producing a high-quality synthesis gas made of solid and/or liquid organic fuels, in particular a bio mass of any type.

According to the invention, the object mentioned initially is solved by the method for producing a synthesis gas from a pyrolysis gas obtained in a pyrolysis reactor and a product gas generated by gasification as per claim 1.

According to claim 1, a method is provided for producing synthesis gas by producing tar-laden pyrolysis and product gases as well as pyrolysis condensate with a high proportion of tar for operating a two-stroke dual-fuel internal combustion engine, which is used for decentralized generation of current and heat, with the following steps:

a. shredding organic raw and waste materials or containing organic matter to obtain the requested grain size and drying to obtain the requested water content of said fuel,
b. feeding the so prepared organic fuel into a pyrolysis reactor,
c. generating and feeding thermal energy for performing an endothermal decomposition of the organic fuel at a pyrolysis temperature between 400° C. and 650° C. while generating pyrolysis gas and pyrolysis coke,
d. purifying and cooling the pyrolysis gas to approx. 300° C. followed by gas washing with cooling and quenching below 60° by condensing the tars of the pyrolysis gas out with pyrolysis condensate and/or vegetable oil,
e. conveying the pyrolysis coke into a fuel barrier (container) of a gasifier or directly into the gasifier and capturing the pyrolysis condensate for generating ignition oil for the internal combustion engine,
f. total or partial autothermal gasification of the pyrolysis coke by supplying air and/or technical oxygen and/or water steam to form a product gas at temperatures of approx. 1000° C. and by supplying heat from a branch-current recirculating product gas for heating the gasifier,
g. purifying and cooling the product gas to approx. 300° C.,
h. recirculation of the branch current of the product gas for heating the gasifier according to step f), by heating up in a preheater in the main current of the hot product gas,
i. additional purifying of the product gas or of the synthesis gas formed after aggregation of the same and of the pyrolysis gas of tar and dust particles in a gas scrubber with a washing oil as well as cooling to a temperature of approximately 40° C. by forming a tar-containing pyrolysis condensate,
j. for washing the product gas, a vegetable oil is used as a washing liquid, which vegetable oil is purified after saturation in an ignition oil preparation,
k. aggregation of the pyrolysis gas still having a calorific value of >15 $MJ/Nm^3$ with the low-calory, first of all exclusively purified product gas according to step i) (calorific value <10 $MJ/Nm^3$) to form a synthesis gas,
l. subsequent purifying the synthesis gas provided for operating the internal combustion engine in a tar electrostatic filter to remove practically all tar and dust particles according to the engine requirements,
m. compressing the purified synthesis gas in a synthesis gas compressor to >200 bar for direct injection of the synthesis gas into the internal combustion engine,
n. processing the washing oil together with the pyrolysis condensate and the tar from the electrostatic filter in an ignition oil preparation from a centrifuge and a homogeniser, in which the long-chain molecules are shortened mechanically, whereas said mixture is injected as ignition oil into the internal combustion engine, o. injection of the highly compressed synthesis gas as well as of the ignition oil via separate injectors into the combustion chamber and introduction of the combustion air, separately from said fuels also via its own channel into the cylinder of the internal combustion engine.

The method according to the invention as per claim 1 for generating a synthesis gas and pyrolysis oil as well as condensate for operating an internal combustion engine in the form of a dual fuel engine or a dual fuel engine-block heat and power plant is characterized in that the fuel, for instance mixed organic waste, also carefully sorted and separated domestic refuse, but preferably biomass of any type, such as pig, cow and chicken manure, is processed and conveyed to a pyrolysis plant in the first step of the process.

The pyrolysis coke generated in the pyrolysis is gasified to obtain a product gas. As pyrolysis is an endothermal decomposition, the required thermal energy is conveyed to the pyrolysis reactor in the form of heat in the first step (<300° C.-450° C.) through the engine exhaust gas of the internal combustion engine to be driven and in the second step directly or indirectly through the hot product from the gasifier or subjected to direct firing.

The thermal energy can be introduced, as a back-up or solely, via direct introduction of the hot bed ash evacuated from the gasifier or the bed material. The pyrolysis temperature lies in the range between 400° C. and 650° C. (claim 2).

The generated pyrolysis gas (calorific value>15 MJ/Nm$^3$) is subsequently purified in a hot gas cyclone separator of trapped dust particles.

From the pyrolysis coke, preferably according to claim 3, in an atmospheric gasifier or in a stationary fluidized bed gasifier, a low-calory product gas (calorific value <10 MJ/Nm$^3$) is generated and subsequently also purified in a hot gas cyclone separator. The gasification is an endothermal method. To do so, the energy required for maintaining the process is taken from the product gas strang generated. Technical oxygen and/or steam can also be used instead of the conveyed air, which is also necessary.

Pyrolysis and product gases are generated separately from each other according to the invention, which are tar-laden and in so doing can also be highly tar-laden preferably. Pyrolysis condensates are accordingly recovered with a high proportion of tar.

BEST AND VARIOUS MODES FOR CARRYING OUT INVENTION

Figure 1:
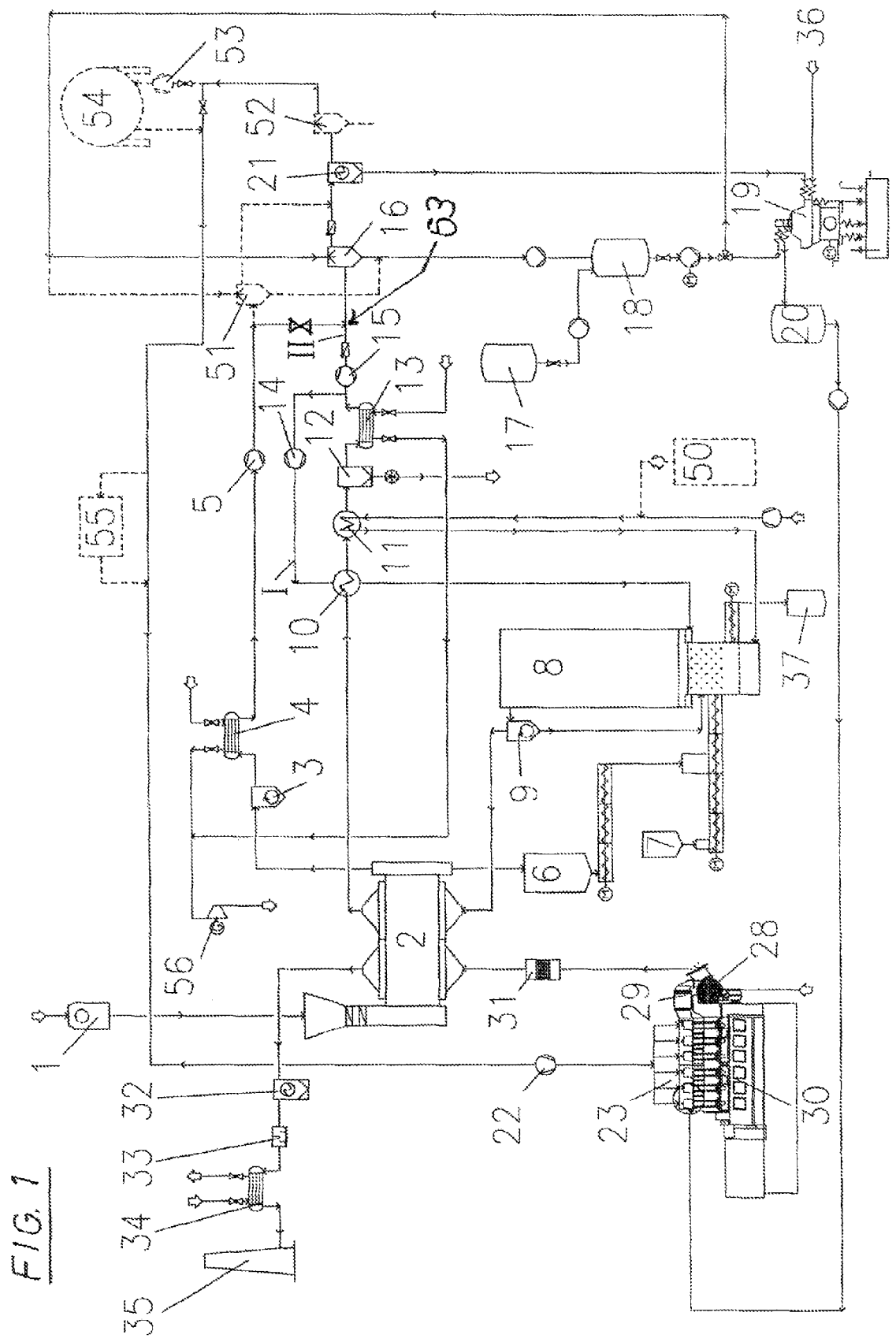
FIG. 1 is a schematic diagram illustrating the apparatus arrangement according to an embodiment of the present invention.

In the method according to the invention, the process is not the same as per document DE 102 58 485 A1, in which substances acting as energy carriers are subjected to pyrolysis and then fluidised bed gasification, whereas the pyrolysis gas combines with the circulating product gas of the gasifier in the external channel of the fluidised bed gasifier, and then conveyed together through the fluidised bed, so as to proceed to simultaneously purification of tar-containing hydrocarbons (pyrolysis condensates and pyrolysis oils are gasified in situ).

Far more, only pyrolysis coke is conveyed according to the method of the invention from the pyrolysis reactor to the atmospheric gasifier employed, whereas product gas and pyrolysis gas of these reactors are separately from each other cooled and purified.

Pyrolysis and product gas are mixed after the respective purification and cooling to obtain synthesis gas. Tars and additional dust particles are purified in a gas scrubber. To do so, the hot synthesis gas (approx. 300° C.) is cooled down to approx. 40° C. Vegetable oil acting as washing oil is preferably used as washing liquid. If the washing oil is saturated, it is purified in a centrifuge and preferably, but not exclusively, processed together with the pyrolysis oil, condensate and tar from the tar electrostatic filter in a homogeniser. In so doing, long-chain molecules are shortened using a special physical method. The consequence is that the washing oil can be mixed homogeneously with the pyrolysis oil and/or the pyrolysis condensate and used as a pilot oil in the internal combustion engine.

Once the synthesis gas has been purified, it then goes through an electrostatic tar filter, in which the last remaining impurities are removed. So freed from tar and dust particles, the highly compressed synthesis gas (>200 bar) is conveyed to an internal combustion engine, whereas the compressed gas is injected via a separate injector directly into the combustion chamber. The combustion air is introduced via its own channel into the engine (claim 4).

Slow rotating two-stroke dual-fuel engine can hence be used as an internal combustion engine. Only in such a special two-stroke dual-fuel engine and not it normally employed four-stroke engines, as those known for instance from document DE 198 24 747 A1, it is thus possible to convey the diesel portion not only exclusively in smaller percentage as pure "ignition oil", but rather with the high percentage already mentioned of pyrolysis oil and pyrolysis condensate, whereas it can also include a high proportion of tar.

The "proportion of diesel", in which ignition oil consists of pyrolysis oil, pyrolysis condensate and/or tar oil, may hence comprise up to 100% of the fuel conveyed, whereas said portion is preferably greater than 40%.

The pyrolysis gas and the pyrolysis condensate are to a certain extent not returned to the gasifier, contrary to the state of the art, and eliminated, but rather used separately and immediately as fuel in the special "two-stroke dual-fuel engine" provided.

For that purpose, the use of a special device for ignition oil preparation is necessary, in which on the one hand the laden washing fluid, the pyrolysis oil as well as the pyrolysis gas are combined and then purified of gross impurities in a separator. On the other hand, after adding tars from the electrostatic filters, ignition oil or pyrolysis condensate with a high proportion of tar is produced, whereas it can be used to a certain extent in large quantities for operating the two-stroke dual-fuel engine.

The ignition oil preparation includes shredding the long-chain molecular chains of the pyrolysis oil and condensates respectively of the hydrocarbon molecules via a special homogeniser and mixing them thoroughly.

Problematic organic fuel can also be first used by such a special method variation, whereas the processed pyrolysis oil and pyrolysis condensate acts as ignition oil for the dual fuel engine. The ignition oil preparation hence includes homogenisation by means of a precisely set tooth geometry of the sprocket wheels of the homogeniser for fragmenting the long-chain hydrocarbon molecules. Moreover, exclusively vegetable oil according to the invention is used for washing. The washing process is hence simultaneously a quenching process at which the gas temperature is cooled down from 300° C. to 40° C. through this washing liquid.

Preferably, technical oxygen or water steam ($H_2O$) can be injected during the gasification step. The portion of $N_2$ in the synthesis gas is strongly reduced by the introduction of oxygen during the gasification step. The calorific value Hu reaches above 8.0 MJ/Nm$^3$ synthesis gas. The main components are CO, $H_2$, $CO_2$, $CH_4$ and other gases in small quantities. The consequence is the reduction of the produced quantity of synthesis gas, so that the following devices can be sized smaller for cooling, purification, compression and storage.

$CO_2$, $H_2$ and CO can also be washed out optionally in normal operation and be used otherwise, for example for liquefaction. The reduction provides advantages as regards the dimensions of the components to be defined. They can also be smaller taking into the reduced volume.

Devices for applying the method according to the invention are provided according to the claims 5-8.

The advantages of the invention
a) With said gasification plants, a defined, unchanging fuel is required for technically immaculate operation.
The inventive pyrolysis plant can be operated variably with alternating, heterogeneous organic fuels. Pyrolysis gas, pyrolysis coke, pyrolysis oil and tar are generated mainly in different proportions. The pyrolysis coke is gasified in a second step in a gasifier.
b) incorporation of any thinkable biomass or processed organic waste as a fuel in efficient, decentralised energy generation plants as of a power of 500 kWel, also with heat off-take
c) Disposal of problem substances such as for instance chicken manure or similar and extensive sustainable protection against environmental pollution.
d) Environmentally friendly solution for disposal problems and reduction of disposal costs, since residual substances are mineral and form max. 2-3% of the fuel used.
e) Production of high quality synthesis gas, composed of pyrolysis and product gas with a calorific value of >10 kJ/Nm$^3$. In particular when using technical oxygen instead of air during the gasification step the portion of $N_2$ is considerably decreased. The consequence is a reduced quantity of synthesis gas to be cooled, purified, compressed and optionally stored, as well as an increased system efficiency degree.
f) Deposits of dust and condensation of tars in the combustion chamber of the engine are almost completely avoided thanks to the costly gas purification and in particular bypassing of turbocharger and charge air cooler.
g) Usage of pyrolysis oil, pyrolysis condensate and tar as an ignition oil for the synthesis gas. Hence the absence of extensive disposal.

EXAMPLES OF EMBODIMENT

Figure 2:
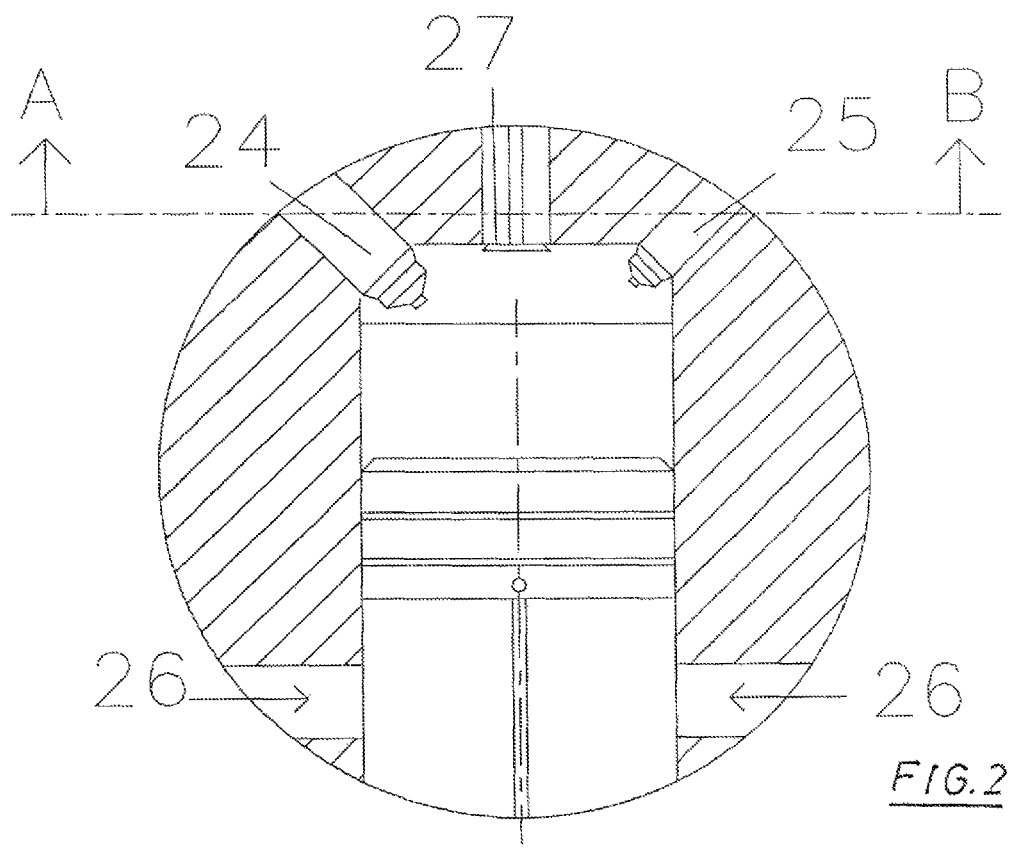
FIG. 2 is a schematic diagram of apparatus for injection into the combustion chamber of internal combustion engine (30).
Figure 3:
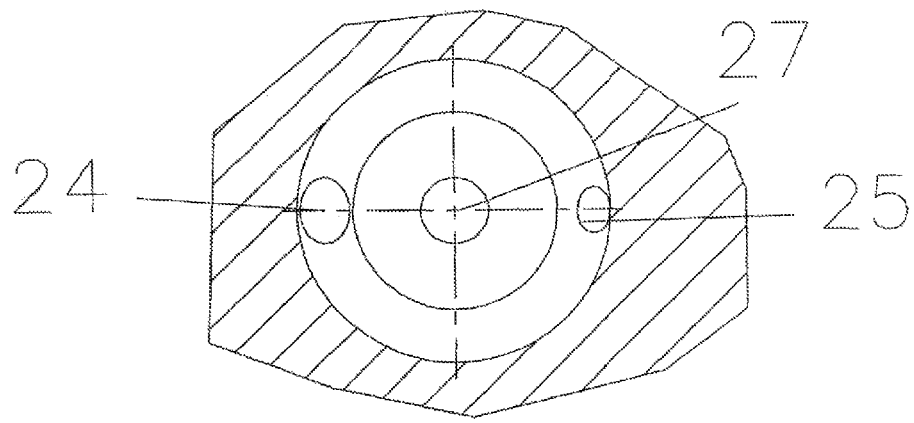
FIG. 3 is a cross sectional view at AB of FIG. 2.

The sequence of the method and the main components of the plant are represented in FIGS. 1, 2 and 3 of the drawings for a preferred embodiment of two described embodiments of the invention.

FIG. 1 Shows
Fuel drier (1)
The fuel shredded after delivery in a shredded to obtain the requested grain size is dried in a fuel dryer (1) to obtain the water content required for the respective fuel. The thermal energy for the drying process is recovered from the low-temperature cooling system of the engine (<90° C.) and other system waste heat. The dryer can have different designs, a belt drier should be used preferably.
The fuel is conveyed from the drier by means of a screw conveyor or of a conveyor into a fuel collecting tank for the pyrolysis reactor.
The treatment of the initial fuel is hence important since consequently the gas quality and the cold gas efficiency are influenced significantly.
Pyrolysis reactor (2)
The pyrolysis takes place preferably in a two-stage rotary pipe pyrolysis reactor (2).
The pyrolysis plant can be operated with alternating fuels (all possible organic carbon-containing materials, for instance organic waste) and requires thermal energy from the outside (exothermal method). Pyrolysis coke, pyrolysis oil and pyrolysis gas are generated mainly in different proportions.
The thermal energy is fed in the form of heat via the engine exhaust gas in the first step of the process. In the second step of the process, the product gas (approx. 950° C.) obtained from gasification is preferably used directly or via heat exchangers so as to further increase the pyrolysis temperature. Direct firing or introduction of thermal energy in the form of hot bed ash and bed material from the gasifier is also possible. A storage unit (37) fitted with an introduction device is provided for that purpose. The pyrolysis here ranges between 400° C. and 650° C. The decomposition process taking place gives rise to a product in solid (pyrolysis coke), liquid (condensate, pyrolysis oil) and gaseous (pyrolysis gas) aggregate state.
2.1. Pyrolysis Coke
The pyrolysis coke, which mainly consists of pure carbon, is preferably conveyed from the pyrolysis reactor into a fuel barrier (container) (6) for the fluidised bed gasifier (8). Another type of storage is also quite possible.
2.2. Pyrolysis Oil
The pyrolysis oil is captured, mixed to the ignition oil for the internal combustion engine and/or introduced directly into the gasifier (8).
2.3. Pyrolysis Gas
After gross purification in a hot gas cyclone separator (3), the pyrolysis gas is cooled in a gas cooler (4) to the required temperature. The pyrolysis gas is guided with the product in a common pipe with a booster fan (5). A separate gas scrubber (51) for gas washing can be used optionally.
Hot Gas Cyclone Separator (3) for Pyrolysis Gas Stream
The dust particles trapped in the gas stream with a grain size>0.1 mm are separated in the hot gas cyclone. This enables among other things to reduce the abrasive effect and to prevent premature clogging of the heat exchangers.
Gas Cooler (4)
The pyrolysis gas is cooled from approx. 580° C. to approx. 300° C. in the heat exchanger. The thermal energy hence decoupled is used for generating steam, which in turn drives a steam turbine (56) to generate electricity.
Booster Fan (5)
The booster fan serves to compensate for pressure loss in the gas pipe and the apparatuses. Moreover, the pyrolysis gas strand can be regulated more precisely when combined with the product gas strand.

Fuel Barrier (6) for Gasifier (Container)

The pyrolysis coke (PK) coming out of the pyrolysis reactor is captured and stored temporarily in this container. PK is homogeneous and consists of almost 100% carbon. It further provides an outstanding fuel for the gasification (8).

Collecting Tank for Bed Material (7)

This contained enables to preserve the material for the formation of a fluidised layer bed. The bed material is usually dolomite or a similar limestone. Modifying the composition of the bed material enables if necessary to obtain catalytic effects in the gasification process.

Atmospheric Gasifier (8)

An atmospheric gasifier, preferably a stationary fluidised bed gasifier with stepped air supply, which delivers optimal conditions for the expected gas/solid reactions due to intensive and thorough mixing, is used for gasification. The gasification occurs autothermally with air at a temperature of at least 900° C., whereas a portion of the fuel utilised for gasification is burnt or partially burnt so as to reach and maintain said temperature. The air required for fluidisation and gasification is introduced into the gasification chamber through nozzles regularly distributed in the lower primary floor and upper secondary floor of the gasifier using an air intake fan for the gasification chamber. Optionally, it is possible to use pure oxygen instead of air, produced in an oxygen generator (50). The cross section and height of the gasification chamber are chosen in such a way that sufficient contact and dwell times of the product gas of about 5 seconds with a empty pipe velocity of <1.5 m/s are achieved, before the product gas leaves the gasification chamber at a temperature above 1,000° C. at the head end. The product gas is cooled down to approx. 250° C. in a gas cooler (13) connected downstream. The decoupled heat is used selectively for preheating the fresh air to be used, optional oxygen coming out of the oxygen generator (50), for steam generation for a secondary production of electricity via a steam turbine, as process heat or for heating up water for heating purposes.

For controlling the gasification temperature and for homogenising the product gas, a regulated partial quantity I of the discharged product gas after dedusting (12, 13) and cooling down in the waste heat exchanger (10), or in a preheater for the product gas recirculating into the gasifier (8), is recirculated using a circulation fan (14) together with the pre-heated fresh air into the gasification chamber. The residual portion II of the gas is separated for usage in the gas-diesel engine, which is designed as a two-stroke dual-fuel internal combustion engine (30).

The operation of the gasifier takes place to a vast extent without faults caused by inhomogeneous fuel, since here mainly pyrolysis coke is used as fuel.

Hot Gas Cyclone Separator (9)—for Product Gas Stream

After the waste heat recovery boiler, the synthesis gas is dedusted in a hot gas cyclone separator. To do so, the dust particles trapped in the gas stream with a grain size>0.1 mm are separated in the gas stream. This enables among other things to reduce the abrasive effect in the gas stream and to prevent premature clogging of the heat exchangers.

Preheater (10) for the Partial Quantity of the Product Gas to be Recirculated A portion of the product gas is recirculated i.e., it is returned to the gasifier (8), so as to maintain the thermal process. The temperature of the partial quantity of the product gas recirculating to the gasifier is increased in the preheater and the main gas stream is cooled down.

Air Pre-Heater (11)

To do so, the high heat in the product gas stream is used to raise the temperature of the amount of air necessary for the gasification and hence to increase the efficiency in the gasifier.

Hose Filter (12)

This filter is high temperature resistant and is used to separate the fine dust particles remaining in the product gas stream. The segregated fine dust is collected in a close container and disposed of. (Fly ash)

Gas Cooler (13)

The temperature of the product gas is lowered to approx, 300° C. in said gas cooler being a heat exchanger. The tar particles contained in the gas are not yet condensed out at that temperature.

Circulation Fan (14)

A portion of the product gas generated is branched off from the main gas strang for maintaining the thermal process in the gasifier and then returned to the gasifier. Said fan performs said recirculation.

Product Gas Booster Fan (15)

The booster fan serves to compensate for pressure loss in the gas pipe and the apparatuses. Moreover, the pyrolysis gas strand can be regulated more precisely when combined with the product gas strang.

Synthesis Gas Scrubber (16)

The product gas and pyrolysis gas to be purified are conveyed to the synthesis gas scrubber (16) via a manifold, inasmuch as an additional gas scrubber (51) is switched off for the pyrolysis gas. The synthesis gas scrubber (gas washer) consists of a beam gas scrubber with an expansion vessel connected downstream and a droplet separator. The scrubbing takes place via a washing liquid circulation. A depression of approx. 5 mbar is generated in the beam gas scrubber. If this depression is sufficient for the extraction, any ventilator becomes superfluous.

Vegetable oil is presented in the column bottom and the process gas purification can then take place via the washing circuit. According to the self-adjusting concentration of dusts, the washing circuit is laden, then eliminated automatically via the feeding pump and the column bottom is filled again. The process can also be designed to unfurl continuously. A cooler can be installed in the washing circuit for dissipating heat, which circuit is operated with cooling water 25° C.

The purified process gas leaves the synthesis gas scrubber with a temperature of approx. 40° C., which corresponds to the dew point under these conditions. The heat discharged from 300° C. to 40° C. by the cooling down process is separated in a heat exchanger and used as process heat for heating up condensate and so on.

The plant includes a control box, which supervises the automatic operation. The complete plant is delivered as an assembly can be set in operation immediately after connecting the site services.

Fresh Oil Tank (17)

This tank is used for storing fresh washing oil. The laden oils removed from the washing fluid tank (18) as ignition oil are filled with fresh washing oil from said tank.

Washing Fluid Tank (18)

Here, the laden washing fluid, separated from the gas scrubber is captured and stored. The quantity of fluid required for the gas washing in the gas scrubber (16) or (51) and for use as ignition oil is taken from this tank.

Ignition Oil Preparation (19)

Here, the laden washing fluid, the pyrolysis oil, as well as the pyrolysis condensate are combined and then purified from gross impurities in a separator. After addition of tar from the electrostatic filter (21), the long-chain molecular chains are physically shredded and homogeneously and thoroughly mixed. This method may also concern problematic fuels allowing them to be used as ignition oil. The oil thus processed out of washing fluid, pyrolysis oil and pyrolysis condensate acts as ignition oil for the dual fuel internal combustion engine.

Buffer Tank for Ignition Oil (20)

The processed oil is stored in this tank as an ignition oil.

Tar Electrostatic Filter (21)

The tar electrostatic filter consists of a vertical filter field being flowed through, with a round cross section. To guarantee uniform gas stream and hence optimal separation efficiency, the crude gas is conveyed through a gas distribution before reaching the filter field.

The filter field consists of collecting electrodes arranged in honeycombs, between which the discharge electrodes are located. The sharp-edged strip electrodes assure highest possible filter tension with optimal corona discharge. There is practically no wear of the electrodes.

The electrical spray system is carried by the support insulators. The insulator surfaces are maintained dry constantly by an electrical trace heating to avoid flashovers, in particular during the start and shutdown periods.

There is a high D.C. voltage between the discharge electrodes and the collecting electrodes. The particles to be extracted are ionised by the electrical field which accumulates and by the electrons coming out of the sharp edges of the discharge electrodes, and attracted by the collecting electrodes. They can here deliver their charge and the electrodes are deposited.

The filter system is purified using a periodically hot steam cleaning process, to be performed repeatedly. Flange connections are provided on the filter. The cleaning process should be regulated by the operator according to the degree of contamination.

The segregated condensate mixture (tar) of the crude gas, which drips off from the collecting electrodes, accumulates in the lower section of the filter and is diverted into a containment vessel provided to that effect via a dip closure.

Synthesis Gas Compressor (22)

The synthesis gas should be inserted with a pressure of approx. 200 bar into the combustion chamber in the case of a two-stroke dual fuel internal combustion engine. Said compressor can provide a pressure up to 250 bar.

Synthesis Gas Control Loop (23)

Optimised parameters of the synthesis gas for the engine, such as for example temperature and pressure, are monitored and regulated if required.

Separate Synthesis Gas Injector (24)

The separate injection of synthesis gas with a pressure above 200 bar has the big advantage, that no condensate may form whatsoever before injection into the engine bay. It happens mostly when mixing air and gas before the turbo charger. But the consequence is the regular formation of tar layers as well the clogging of the charge air cooler. This is prevented by the direct introduction of the gases into the cylinder of the engine and the additional result is better stabilisation of the gas mixture.

Ignition Oil Injection, Injector (25)

Here, the processed oil is injected from the buffer tank (20) separately as ignition oil into the cylinder.

Injector (26) with Air Inlet Slots

Here, the air sucked-in via the turbo charger is introduced with a light overpressure Outlet Valve (27)

Turbocharger (28)

Charge Air Cooler (29)

Two-Stroke Dual-Fuel Internal Combustion Engine (30)

The dual fuel internal combustion engine, also diesel-gas engine called, is based thermodynamically on the principle of the diesel process. Said engine combines the advantages of the diesel engine technique with that of Gas-Otto engines. So, dual fuel engines include on top of diesel injection also always additionally a gas control loop as with the Gas-Otto engine and can hence be operated optionally with two fuels.

The injection of ignition oil is therefore necessary, since the dual fuel engine has no spark plugs. A quantity of ignition oil von 8% to 20% is normally necessary, depending on the engine and the operating mode, since the portion of gas is ignited reliably.

Optionally, the dual fuel engine can be operated with different diesel/gas portion (20%:80%-100%:0%). The good partial load behaviour and the high electrical degree of efficiency of the diesel engine are preserved unchanged.

In the case of a four-stroke dual fuel engine, the working energy is introduced into the cylinders via the suction system as with an Otto engine as a gas-air-mixture and exclusively the energy required for igniting the propellant mixture as diesel.

With a two-stroke dual-fuel engine, only the air is pushed into the combustion chamber of the cylinder via the turbocharger. Gas and ignition oil are introduced into the combustion chamber under high pressure via respectively separate injection nozzles. This has the advantage that particles and tars contained in synthesis gases cannot condensate before injection into the combustion chamber on pipework or apparatuses. Two-stroke engines usually exhibit higher electrical degrees of efficiency than four-stroke engines.

The dual fuel engine has the additional advantage that considerably fewer particles are expelled than with a diesel. The pollutant balance analysis relative to $CO_2$ and other exhaust gas components is also quite good.

Dual fuel engine-block heat and power plants such as diesel engine-block heat and power plants are accepted unrestricted for emergency power supply in for example hospitals, hotels, airports, department stores, sprinkler systems etc.

SCR- and Oxi-Catalyser (31)

Since this engine is a dual fuel engine with approx. 8% ignition oil, a SCR-catalyser should be used for maintaining the nitrogen threshold values according to German air pollution laws.

Electrostatic Filter (32) for the Engine Exhaust Gas

The electrostatic filter serves first and foremost as a dust filter for the exhaust gas to bring the particle emissions below the values of the German air pollution laws.

Exhaust Gas Silencer (33)

Exhaust Gas Heat Exchanger (34)

Chimney (35)

Introduction (36)

Introduction (36) of the Pyrolysis Oil and Condensate into the Ignition Oil Preparation (19)

Storage Unit (37)

Storage Unit (37) with an Introduction Device for Bed Ash and Bed Material of the Gasifier Optional Devices
Oxygen Generator (Optional) (50)
Gas Scrubber for Pyrolysis Gas (Optional) (51)

The pyrolysis gas is purified by condensation to obtain synthesis gas, in this gas scrubber to eliminate long-chained hydrocarbons, e.g. in the form for example of tars. The washing medium is selectively water, biodiesel, vegetable oil or another fluid of bio-origin. When using vegetable oil or biodiesel as washing liquid, the laden fluid is mixed to the pyrolysis oil, tar or pyrolysis condensate occurring with the ignition oil for the engine.

$CO_2$-Gas Scrubber (Optional) (52)

Optionally by this gas washer, the $CO_2$ contained in the synthesis gas can be purged and injected directly in liquid or gaseous form as carbon dioxide, as dry ice or in greenhouses so as to improve the growth.

The separation of carbon dioxide from the synthesis gas has the advantage that the level of energy required for compressing the gas is reduced to above 200 bar through the decrease in synthesis gas by the portion of carbon monoxide and hydrogen. Moreover, the gas conveyed to the engine has a higher calorific value due to the higher methane portion and hence burns out more efficiently.

Synthesis Gas Compressor (Optional) (53)
Gas Storage Unit (Optional) (54)
Synthesis Reactor (Optional) (55)
Fischer-Tropsch Process The hydrocarbon synthesis discovered more than 80 years ago by Professor Franz Fischer and Dr. Hans Tropsch and patent-pending is a two-step reaction sequence, with which solid fuels such as biomass, coke or other organic substances can be transformed into liquid propellants such as diesel fuel and petrol. To do so, liquid hydrocarbons are produced from the carbon monoxide and hydrogen portions of a synthesis gas using metal catalysers. The hydrocarbons here synthesised mainly consist of liquid alkanes, also called paraffin oils. Olefins, alcohols and solid paraffins are also spin-off products.

The required synthesis gas can be produced by pyrolysis at 60° C. and higher or by gasification with water steam and/or oxygen at temperatures above 900° from biomass, coke or other carbonaceous organic substances.

The separation of hydrogen and carbon has in the present system the additional advantage that the level of energy required for compressing the gas is reduced to above 200 bar through the decrease in synthesis gas by the portion of carbon monoxide and hydrogen. Moreover, the synthesis gas conveyed to the dual fuel engine has a higher calorific value due to the higher methane portion and hence burns out more efficiently.

Steam Turbine (56)

Figure 4:
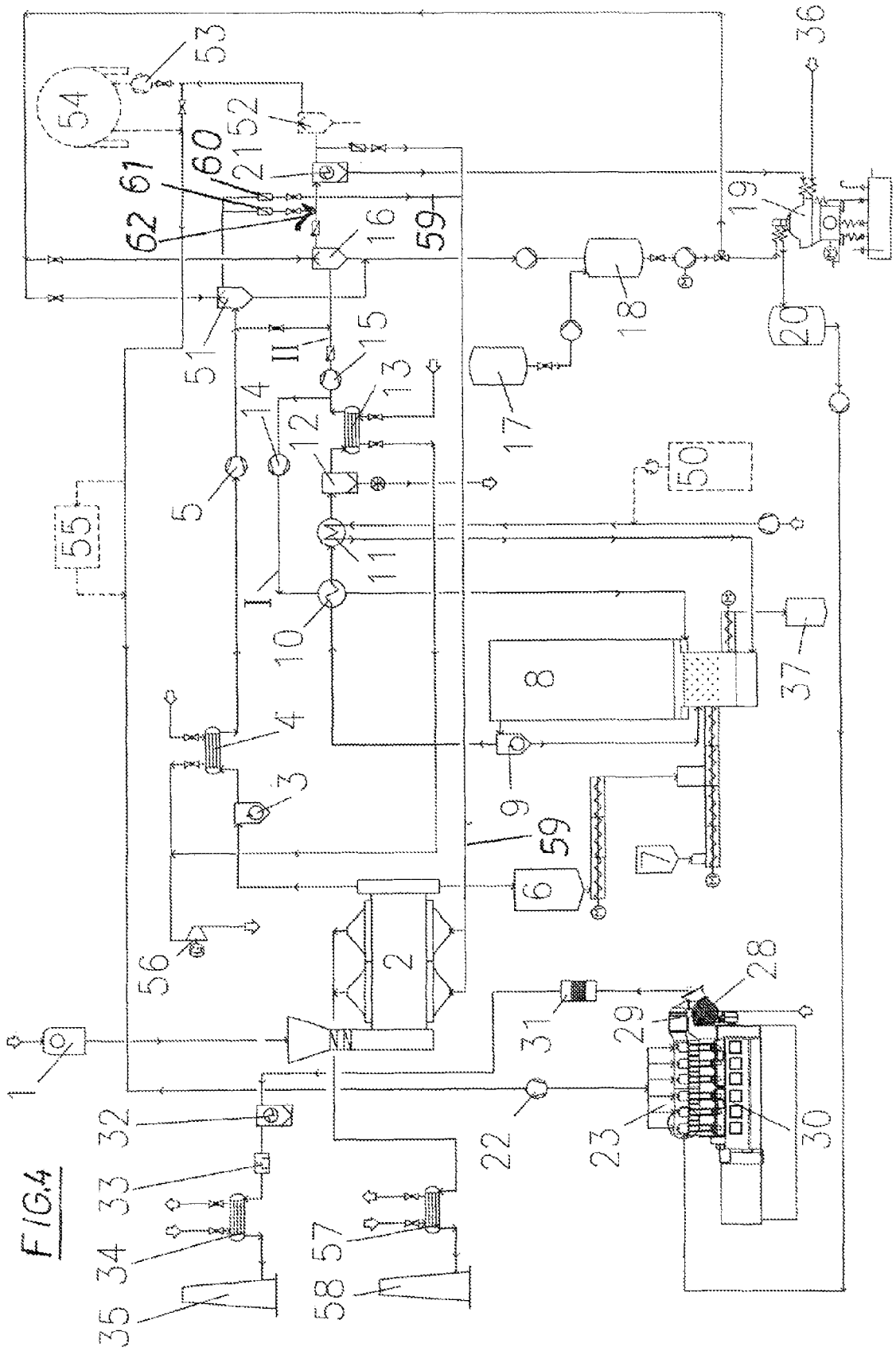
FIG. 4 is a schematic diagram illustrating the apparatus arrangement according to another embodiment of the present invention.

A further exemplary embodiment is represented in FIG. 4.

The thermal energy supplied here for decomposing the organic fuels in the pyrolysis reactor does not originate from the heat of a hot product gas coming out of the gasifier or the engine exhaust gas of the internal combustion engine, but by burning a recirculated portion (generated in the pyrolysis reactor) of the pyrolysis gas. The recirculation into the pyrolysis reactor goes through a pipe (59), which is guided from the gas scrubber (51) via a control loop (60) up to the pyrolysis reactor (2) and consequently encloses the control loop (61) for the portion of the pyrolysis gas to be combined with the product gas. The combination of product gas and of the portion of the pyrolysis gas to be brought together, by forming synthesis gas takes place at the spot (62). The combination according to FIG. 1 on the spot (63) is so far circumvented. By modifying the heat supply into the pyrolysis reactor and by utilising the otherwise same devices the production method consists of highly tar-laden pyrolysis gas, of purified synthesis gas and of tar-laden pyrolysis condensate (portion>40%) with a high proportion of tar for operating a two-stroke dual-fuel engine for decentralized generation of electricity and heat, so far comprising the following steps:

a. shredding organic raw and waste materials or containing organic matter to obtain the requested grain size and drying to obtain the requested water content of said fuel, b. feeding the so prepared organic fuel into a pyrolysis reactor, c. feeding thermal energy for performing an endothermal decomposition of the organic fuel at a pyrolysis temperature between 400° C. and 650° C. while generating pyrolysis gas and pyrolysis coke, d. cooling the pyrolysis gas to approx. 300° C. followed by gas washing in a gas scrubber (51) with cooling and quenching below 60° C. by condensing the tars of the pyrolysis gas out with purified pyrolysis condensate and/or vegetable oil, e. burning a portion of the pyrolysis gas for generating the heat energy necessary for the pyrolysis, f. conveying the pyrolysis coke into a fuel barrier (container) of a gasifier or directly into the gasifier and capturing the condensates for generating ignition oil for the internal combustion engine, g. total or partial autothermal gasification of the pyrolysis coke by supplying air and/or technical oxygen and/or water steam to form a product gas at temperatures of approx. 850° C.-1000° C. and by supplying heat from a branch-current recirculating product gas for heating the gasifier, h. purifying and cooling the product gas to approx. 300° C., i. recirculation of a branch current of the product gas for heating the gasifier, by heating up in a preheater in the main current of the hot product gas, j. purifying of the product gas of tar and further dust particles in a gas scrubber (16) with a washing oil as well as quenching to a temperature of approximately 40° C., k. for washing the pyrolysis gas and the synthesis gas to be generated, a vegetable oil is used as a washing liquid in the gas scrubber (51), which is purified after saturation in a centrifuge, l. aggregation of the pyrolysis gas still having a calorific value of >15 MJ/Nm$^3$ with the low-calory product gas (calorific value <10 MJ/Nm$^3$) by generating the synthesis gas, m. subsequent purifying of the synthesis gas provided for operating the internal combustion engine in a tar electrostatic filter to remove practically all tar and dust particles according to the engine requirements, n. compressing the purified synthesis gas in a synthesis gas compressor to >200 bar for direct injection of the synthesis gas into the internal combustion engine, o. processing the washing oil together with the pyrolysis condensate and the tar from the tar electrostatic filter in a separator or centrifuge and a homogeniser with a precisely calculated tooth geometry, in which the long-chain molecules are shortened mechanically, whereas also the processed washing oil is injected as ignition oil into the internal combustion engine, p. injection of the highly compressed synthesis gas as well as of the ignition oil via separate injectors into the combustion chamber and introduction of the combustion air, separately from said fuels also via its own channel into the cylinder of the internal combustion engine.

The required thermal energy conveyed to the pyrolysis reactor indirectly by burning the pyrolysis gas in the form of heat is hence so high that the pyrolysis is carried out at a temperature between 400° C. and 450° C. The pyrolysis coke is then gasified in an atmospheric gasifier. Exhaust gas can thereby be separated from the pyrolysis reactor also via a heat exchanger (57), whereas said exchanger is connected to a chimney (58).

The device utilised hence consists of a. fuel drier (1) and a storage unit with fuel barrier container;
b. a two-stage generation of fuel gas, in which the first stage is a pyrolysis reactor (2) for forming a pyrolysis gas as well of pyrolysis coke and the second stage is a gasifier (8) for pyrolysis coke from the pyrolysis reactor to form a product gas. The type of gasifier used is a stationary atmospheric gasifier or a rotary pipe gasifier. Pyrolysis as well as gasifier can be operated respectively separately and independently from one another.

Further comprising:

c. a hot gas cyclone separator (3, 9) respectively installed into the pyrolysis and product gas streams, and a hose filter (12) in the product gas stream;
d. heat exchangers or gas coolers (4, 13) installed into the respective pyrolysis and product gas streams for respective cooling of the pyrolysis and product gas to approx. 300° C.;
e. a gas scrubber (16, 51) respectively installed in the pyrolysis and product gas stream;
f. a tar electrostatic filter (21) installed in the synthesis gas strand after junction of the pipes of the pyrolysis and product gas streams;
g. a device enabling mechanical and/or biological and/or physical and/or chemical purification of the synthesis gas;
h. a gas compressor or synthesis gas compressor (22) with which the synthesis gas can be compressed to >200 bar;
i. an ignition oil preparation (19), composed of a centrifuge or a separator and a homogeniser, in which laden washing oil and/or condensate coming out of the pyrolysis reactor (2) and/or tar coming out of the tar electrostatic filter (21) can be processed for use as ignition oil;
j. a two-stroke dual-fuel engine (30) as an internal combustion engine, which has separate injectors (24, 25, 26) for the highly compressed synthesis gas, for the ignition oil formed of washing oil and/or pyrolysis oil or pyrolysis condensate and/or tar oil, as well as for the combustion air, whereas the highly compressed synthesis gas can be injected via the separate injector (24) into the dual-fuel engine (30);

Such device is advantageous when combined with a device for supplying thermal energy into the pyrolysis reactor according to FIG. 1, for instance for supplying engine exhaust gas and/or combined with a heat exchanger for introducing thermal energy.

Gas Qualities

|  | Pyrolysis gas | Product gas from gasification with air | Synthesis gas mixture of pyrolysis gas and product gas |
|---|---|---|---|
| Low Heat Value [kJ/Nm³] | 15.691 | 5.230 | 8.717 |
| Low Heat Value [kW/Nm³] | 4.36 | 1.45 | 2.42 |
|  | [vol %] | [vol %] | [vol %] |
| Carbon dioxide ($CO_2$) | 37.50 | 10.00 | 19.17 |
| Carbon monoxide (CO2) | 27.50 | 27.02 | 27.18 |
| Methane ($CH_4$) | 12.00 | 2.02 | 5.35 |
| Hydrogen ($H_2$) | 12.50 | 7.77 | 9.35 |
| Oxygen ($O_2$) |  | 0.37 | 0.37 |
| Nitrogen ($N_2$) | 2.00 | 47.71 | 32.47 |
| Sulfur dioxide ($SO_2$) |  | 0.01 | 0.01 |
| Hydrochloric acid (HCl) |  | 0.00 | 0.00 |

-continued

|  | Pyrolysis gas | Product gas from gasification with air | Synthesis gas mixture of pyrolysis gas and product gas |
|---|---|---|---|
| Water ($H_2O$) | 2.75 | 5.10 | 4.32 |
| Ethane ($C_2H_4$) | 1.00 |  | 1.00 |
| Ethane ($C_2H_6$) | 1.00 |  | 1.00 |
| Propane ($C_3H_8$) |  |  | 0.00 |
| Butane ($C_4H_{10}$) |  |  | 0.00 |
| 2.2-Dimethylpropane 2.0 ($C_5H_{12}$) |  |  | 0.00 |
| Benzol ($C_6H_6$) |  |  | 0.00 |
| 2.2 Dimethylbutane ($C_6H_{14}$) |  |  | 0.00 |
| $C_xH_y$ | 5.50 |  |  |

LIST OF REFERENCE NUMERALS

1 Fuel drier
2 Pyrolysis reactor
3 Hot gas cyclone separator (pyrolysis gas stream)
4 Gas cooler (heat exchanger)
5 Booster fan
6 Fuel barrier for the gasifier (container)
7 Collecting tank for bed material of the gasifier
8 Atmospheric gasifier (preferably stationary fluidised bed gasifier)
9 Hot gas cyclone separator (product gas stream)
10 Preheater for the partial quantity of product gas recirculating into the gasifier (waste heat exchanger)
11 Air pre-heater
12 Hose filter (product gas stream)
13 Gas cooler (heat exchanger)
14 Circulation fan for the product gas recirculating into the gasifier
15 Product gas—booster fan
16 Synthesis gas scrubber or product gas scrubber, according to the point of junction with the pyrolysis gas
17 Fresh oil tank
18 Washing fluid tank
19 Ignition oil preparation (centrifuge with homogeniser)
20 Buffer tank for ignition oil
21 Tar electrostatic filter
22 Synthesis gas compressor
23 Synthesis gas control loop
24 Injector for the introduction of synthesis gas
25 Injector for the introduction of ignition oil
26 Injector for the air intake
27 Outlet valve
28 Turbocharger
29 Charge air cooler
30 Two-stroke dual-fuel internal combustion engine
31 SCR- and Oxi-cat
32 Electrostatic filter for the engine exhaust gas
33 Exhaust gas silencer
34 Exhaust gas heat exchanger
35 Chimney
36 Introduction in ignition oil preparation (19)
37 Storage unit with an introduction device for bed ash and bed material of the gasifier
50 Oxygen generator
51 Gas scrubber for pyrolysis gas
52 $CO_2$-gas scrubber
53 Synthesis gas compressor
54 Gas storage unit 55 Synthesis reactor
56 Steam turbine
57 Heat exchanger for separating exhaust gas
58 Chimney
59 Pipe for pyrolysis gas to be recirculated
60 Control loop for the portion of the pyrolysis gas to be recirculated
61 Control loop for the portion of the pyrolysis gas to be combined with the product gas
62 Spot-Point of junction of product gas and pyrolysis gas by forming a synthesis gas (alternative) (FIG. 4)
63 Spot-Point of junction of product gas and pyrolysis gas by forming a synthesis gas (FIG. 1)

The invention claimed is:
1. A method for producing synthesis gas by producing tar-laden pyrolysis and product gases and pyrolysis condensate with a high proportion of tar for operating a two-stroke dual-fuel internal combustion engine, used for decentralized generation of current and heat, comprising the following steps:
  a. shredding organic raw and waste materials or containing organic matter to obtain a requested grain size and drying to obtain a requested water content of said fuel,
  b. feeding the so prepared organic fuel into a pyrolysis reactor,
  c. generating and feeding thermal energy for performing an endothermal decomposition of the organic fuel at a pyrolysis temperature between 400° C. and 650° C. while generating pyrolysis gas and pyrolysis coke,
  d. purifying and cooling the pyrolysis gas to approximately 300° C. followed by gas washing with a washing medium in the form of biodiesel and/or vegetable oil with cooling and quenching below 60° C. by condensing the tars of the pyrolysis gas out with pyrolysis condensate and/or with said biodiesel or said vegetable oil,
  e. conveying the pyrolysis coke into a fuel barrier of a gasifier or directly into the gasifier and capturing the pyrolysis condensate for generating ignition oil for the two-stroke dual-fuel engine providing a gas-diesel internal combustion engine,
  f. total or partial autothermal gasification of the pyrolysis coke by supplying air and/or technical oxygen and/or water steam to form a product gas at temperatures of approximately 1000° C. and by supplying heat from a product gas thus recirculating branch current for heating the gasifier,
  g. purifying and cooling the product gas to approximately 300° C.,
  h. recirculating the branch current of the product gas for heating the gasifier according to step f), by heating up in a preheater in a main stream of the hot product gas,
  i. additional purifying of the product gas or of the synthesis gas formed after aggregation of the same and of the pyrolysis gas of tar and dust particles in a gas scrubber with a washing oil as well as cooling to a temperature of approximately 40° C. by forming a tar-containing pyrolysis condensate,
  j. aggregation of the pyrolysis gas still having a calorific value of greater than 15 MJ/Nm3 with the low-calorie, first of all exclusively purified product gas according to step i) (calorific value less than 10 MJ/Nm3) to form a synthesis gas,
  k. subsequent purifying the synthesis gas provided for operating the internal combustion engine in a tar electrostatic filter to remove practically all tar and dust particles according to the engine requirements,
  l. compressing the purified synthesis gas in a synthesis gas compressor to greater than 200 bar for direct injection of the synthesis gas into the internal combustion engine,
  m. processing the laden washing oil together with the pyrolysis condensate and the tar by extraction from the tar electrostatic filter, with homogenous thorough mixing and with mechanical shortening of the long-chain hydrocarbon molecules, whereas said liquid mixture is injected as ignition oil into the internal combustion engine,
  n. injection of the highly compressed synthesis gas and the ignition oil via separate injectors into the combustion chamber of the internal combustion engine and by introduction of the combustion air, separately from said fuels also via its own channel into the combustion chamber.

2. A method for producing synthesis gas for an internal combustion engine and for operating the same according to claim 1, wherein the thermal energy required for pyrolysis of the organic processed fuel is conveyed to the pyrolysis reactor in the form of heat in a first step less than 300° C.-450° C. through the exhaust gas of the internal combustion engine and in a second step via heat exchangers for the hot product out of the gasifier, by direct firing and/or by introducing thermal energy, as a back-up or on their own, via a direct introduction of a hot bed ash evacuated from the gasifier, and a bed material.

3. A method according to claim 1, wherein the pyrolysis coke is gasified in an atmospheric gasifier.

4. A method according to claim 1, wherein the synthesis gas compressed to greater than 200 bar is injected into the combustion chamber of the internal combustion engine via a separate injector, whereas the combustion air reaches into the combustion chamber via its own channel.

5. A method according to claim 1, wherein the washing oil is processed together with the tar from the electrostatic filter and the pyrolysis condensate in an ignition oil preparation from a centrifuge and a homogenizer.

6. A method according to claim 1, wherein a vegetable oil is used for gas washing the pyrolysis gas and/or the product gas or the synthesis gas formed after aggregation, which vegetable oil is purified after saturation in an ignition oil preparation.

7. The method of claim 1, wherein recirculated purified pyrolysis condensate is used for purifying and cooling the pyrolysis gas, whereas the pyrolysis gas is quenched simultaneously.

8. A method according to claim 6, wherein the gas washing is carried out exclusively with the washing oil in the form of the vegetable oil.

9. A device for realizing the method according to claim 1, comprising:
  a. a fuel drier and a storage unit with a collecting tank;
  b. a device for two-stage generation of fuel gas for a synthesis gas and for generating an ignition oil used for combustion in the two-stroke dual-fuel engine,
  in which the first stage is a pyrolysis reactor to produce a pyrolysis gas and pyrolysis coke and the second stage is a stationary atmospheric gasifier for pyrolysis coke coming out of the pyrolysis reactor to obtain a product gas,
  whereas said elements are connected into two steps for fuel gas generation and the first step takes place in the pyrolysis reactor and the second step in the stationary atmospheric gasifier, and the pyrolysis reactor includes a heat exchanger for the product gas, so that the thermal energy required for pyrolysis can be reclaimed from the energy of the product gas generated in the gasifier or that an introduction device for a hot bed ash collected in a storage unit and for the bed material coming out of the gasifier-is provided for injection into the pyrolysis reactor, so that the thermal energy required for pyrolysis can be fed via said device;

further comprising:

c. a hot gas cyclone separator respectively installed in the pyrolysis and product gas streams, and a hose filter in the product gas stream;

d. heat exchangers installed in the respective pyrolysis and product gas streams for respective cooling of the pyrolysis and product gas to approximately 300° C.;

e. a gas scrubber respectively installed in the pyrolysis and product gas stream or synthesis gas stream;

f. a tar electrostatic filter installed in the synthesis gas stream after junction of the pipes of the pyrolysis and product gas streams;

g. a device enabling mechanical and/or biological and/or physical and/or chemical purification of the synthesis gas;

h. a synthesis gas compressor with which the synthesis gas can be compressed to greater than 200 bar:

i. an ignition oil preparation, in which laden washing oil and/or pyrolysis condensate coming out of the pyrolysis reactor and/or tar coming out of the tar electrostatic filter can be processed for use as ignition oil;

j. a two-stroke dual-fuel engine-as an internal combustion engine, which has separate injectors for the highly compressed synthesis gas, for the ignition oil formed of washing oil and/or pyrolysis oil or pyrolysis condensate and/or tar oil, and for the combustion air, whereas the highly compressed synthesis gas can be injected via the separate injector into the two-stroke dual-fuel engine.

10. A device according to claim 9, wherein an oxygen production unit can be operated parallel to the gasifier and that said gasifier is provided with corresponding nozzles, so as to inject technical oxygen and/or water steam as gasification means.

11. A device according to claim 9, wherein a $CO_2$-washer is installed in the synthesis gas stream, for extensive washing out of the $CO_2$-content in the synthesis gas.

12. A device according to claim 9, wherein a synthesis reactor is installed, so as to separate the $H_2$ content and the CO-content in the synthesis gas as required and to liquefy them according to the Fischer-Tropsch process.

13. A device according to claim 2, wherein the ignition oil preparation consists of a centrifuge and of a homogenizer with sprocket wheels for fragmenting long-chain hydrocarbon molecules according to a tooth geometry of the sprocket wheels and for thorough mixing of the liquids.

14. A method according to claim 2, wherein the pyrolysis coke is gasified in an atmospheric gasifier.

15. A method according to claim 2, wherein the synthesis gas compressed to greater than 200 bar is injected into the combustion chamber of the internal combustion engine via a separate injector, whereas the combustion air reaches into the combustion chamber via its own channel.

16. A method according to claim 3, wherein the synthesis gas compressed to greater than 200 bar is injected into the combustion chamber of the internal combustion engine via a separate injector, whereas the combustion air reaches into the combustion chamber via its own channel.

17. A method according to claim 2, wherein the washing oil is processed together with the tar from the electrostatic filter and the pyrolysis condensate in an ignition oil preparation from a centrifuge and a homogenizer.

18. A method according to claim 3, wherein the washing oil is processed together with the tar from the electrostatic filter and the pyrolysis condensate in an ignition oil preparation from a centrifuge and a homogenizer.

19. A method according to claim 4, wherein the washing oil is processed together with the tar from the electrostatic filter and the pyrolysis condensate in an ignition oil preparation from a centrifuge and a homogenizer.

20. A method according to claim 2, wherein a vegetable oil is used for gas washing the pyrolysis gas and/or the product gas or the synthesis gas formed after aggregation, which vegetable oil is purified after saturation in an ignition oil preparation.

* * * * *